United States Patent [19]

Hinden

[11] 4,183,557
[45] Jan. 15, 1980

[54] INSULATIVE FLEXIBLE CONNECTOR

[75] Inventor: Milton Hinden, Massapequa, N.Y.

[73] Assignee: Duro Dyne Corporation, Farmingdale, N.Y.

[21] Appl. No.: 878,065

[22] Filed: Feb. 15, 1978

[51] Int. Cl.² ............... F16L 21/06; F16L 59/14
[52] U.S. Cl. ................................. 285/53; 24/16 R; 285/293; 285/424; 29/509
[58] Field of Search ............ 285/53, 424, 293; 24/16

[56] References Cited

U.S. PATENT DOCUMENTS

| 3,109,670 | 11/1963 | Engel | 285/424 |
| 3,128,220 | 4/1964 | Gracer | 285/424 X |
| 3,214,807 | 11/1965 | Hinden | 285/424 X |
| 3,439,406 | 4/1969 | Wallin | 285/424 X |
| 3,460,856 | 8/1969 | Van Tine et al. | 285/53 |
| 3,836,181 | 9/1974 | Kelver | 285/424 X |

FOREIGN PATENT DOCUMENTS 243931  5/1960  Australia ............... 285/424

Primary Examiner—Thomas F. Callaghan
Attorney, Agent, or Firm—Mark T. Basseches; Paula T. Basseches

[57] ABSTRACT

This invention relates to a flexible connector material of the type used in air circulating systems, such as air conditioning and warm air systems, to span the space between adjacent ducts, whereby vibration in one duct is not transmitted to the other and there is no air loss at the interface. More particularly, the invention relates to a connector material of the type described wherein thermal losses are minimized at the noted interface.

5 Claims, 3 Drawing Figures

INSULATIVE FLEXIBLE CONNECTOR

BACKGROUND OF THE INVENTION

1. Field of the Invention

The present invention is in the field of circulating air systems and pertains more particularly to a stock material adapted to be cut and formed into a fitting for such systems.

2. The Prior Art

It is known in air circulating systems or the like to provide a flexible connector material interposed between rigid duct components, the connector functioning to prevent vibrations present in one duct section from being transmitted to an adjacent section and, hence, throughout the remaining components of the system.

By way of example, flexible connector materials of the type described are illustrated in U.S. Pat. No. 3,214,807 and certain of the patent references therein cited.

Typically, flexible connector material heretofore known has been sold as a stock material in coiled lengths of fifty feet or more and has comprised first and second elongate metal strips, each of which strips has a longitudinal marginal edge connected to a marginal edge of an elongate central fabric web. The resultant construction enables a contractor to sever a length of stock material from the coil and bend the same transversely to match the configurations of the duct.

In use, the formed stock material seals the space between opposed open mouth duct portions by fastening one formed metal strip to the mouth portion of one duct and the other formed metal strip to the open mouth portion of the adjacent duct, whereby the formed stock material provides a continuation of the two duct components, and at the same time reduces transmitted vibration therebetween.

In accordance with modern practice and consonant with the desire to minimize energy loss, it has become standard practice to insulate the metal ducts. While such insulation has taken various forms, the net effect has been to prevent substantial heat loss through the duct material. While insulation of the duct materials themselves has resulted in increased thermal efficiency, substantial losses have been encountered at the interface between ducts spanned by flexible connector material.

SUMMARY OF THE INVENTION

The present invention is directed to an improved flexible connector material, and more particularly is directed to a stock material from which lengths may be severed, the connector material being characterized by an improved resistance to thermal heat loss. The material includes first and second spaced parallel elongate metal strips. A marginal edge of each strip is rolled or folded over one of the edge portions of a central section formed of vibration damping material.

The central section is comprised of two layers of fabric, such as canvas or a like material impregnated with a sealant to render the same impervious to the passage of air, the two fabric layers having sandwiched therebetween a central layer of insulating material, such as polyurethane, fiberglass or the like.

The marginal edges of the metal strips are clampingly engaged over the marginal edges of the canvas or like outer layers substantially in the manner shown in U.S. Pat. No. 3,214,807 or the references therein cited, together with the insulating material captured in position.

It will be understood that the material is generally sold as an elongate strip rolled into a coil, from which segments of a desired length may be severed. When the material is positioned between adjacent duct ends, the three layer spanning component provides an efficient insulating junction at the interface between adjacent duct ends, whereby heat loss is minimized.

It is accordingly an object of the invention to provide an improved flexible connector material.

A further object of the invention is the provision of a flexible connector material having insulating properties whereby heat loss between adjacent duct ends spanned by the connector material is minimized.

Still a further object of the invention is the provision of a flexible connector material of the type described including first and second elongate metal strips disposed in parallel spaced relation, the inner opposed edges of the strips being folded over the opposed marginal edges of a pair of fabric webs (which webs may comprise either individual fabric strips or a single fabric strip which has been folded about its longitudinal axis), the fabric strips having introduced into the interior thereof an elongate blanket or mat of insulating material, whereby the clamping of the margins of the fabric strips by the metal retains the insulating material in position.

A still further object of the invention is the provision of a flexible connector of the type described wherein the insulative material is comprised of a readily compressible substance, such as polyurethane foam or fiberglass wool, which material, by virtue of its compressibility, will not interfere in the formation of the material into a coil.

A further object of the invention is the provision of a method of manufacturing an insulating flexible connector material of the type described.

To attain these objects and such further objects as may appear herein or be hereinafter pointed out, reference is made to the accompanying drawings, forming a part hereof, in which.

Figure 1:
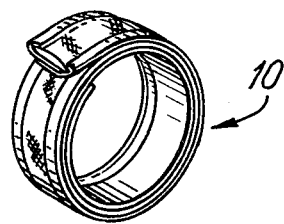
FIG. 1 is a perspective view of a coil of flexible connector material in accordance with the invention.

Turning now to the drawings, there is shown in FIG. 1 a coil 10 of a stock material, lengths of which may be severed for formation into flexible connectors for coupling adjacent ducts to permit uninterrupted air passage while at the same time providing a degree of vibration dampening. A typical environment in which the connector material is used is to connect the plenum of a furnace to a further duct section, as, for instance, a distribution duct, and thereby dampen vibrations in the plenum induced by operation of the furnace blower mechanism.

In accordance with the invention, flexible connector stock material 10 is comprised of first and second metal strips 11, 12, respectively. It will be understood, by way of example and without limitation, that the metal strips may be fifty feet or more in length and may have a width of approximately four to six inches, the strips themselves being formed of thin gauge galvanized steel sheet material.

Strips 11, 12 include outer marginal edges 13, 14, respectively, and inner marginal edge portions 15, 16, respectively. Interposed between the strips 11 and 12 there is provided a central section 17 comprising a three layer construction including an outer fabric layer or web 18, an inner fabric layer or web 19 and an insulative stuffing 20.

The inner and outer layers 18 and 19 are preferably formed of a tough and air impervious fabric material, such as canvas, rubberized canvas, or glass fiber woven to a cloth configuration, etc.

The insulating material 20 is comprised of a compressible, low density material having high resistance to heat transfer therethrough. Examples of preferred materials include polyurethane foam, fiberglass batt, etc.

Obviously, the characteristics of the cloth and the insulating material are to be selected in accordance with the intended end use, i.e. they must be resistant to the heat and/or the cold to which they will be subjected.

The parts are held together by roll forming the marginal edge portions 15, 16 of the strips 11, 12 over the superimposed side marginal areas 21, 22 of the upper and lower webs 18, 19.

It will be readily recognized that various fold configurations may be imparted to the edges 15, 16 supportingly to hold the edges of the fabric. Two typical configurations are illustrated in above referenced U.S. Pat. No. 3,214,807 at FIGS. 4 and 5 thereof, the bending configuration of FIG. 3 of the instant application being essentially the same as that shown in FIG. 5 of the patent.

It will be understood that the present invention is not predicated on any specific manner of attachment of the fabric and metal strips and, accordingly, the invention is not to be considered as limited in this aspect.

In practice, the attachment of the metal strips to the central section is preferably effected by a roll forming operation of the general type more fully described in U.S. Pat. No. 3,214,807 and particularly in the prior art patents therein cited and mentioned, such as Goldsmith U.S. Pat. No. 2,777,573. In accordance with such method, the two metal strips are simultaneously fed, preferably in a longitudinal direction, in overlapped condition, and the central strip is laid atop the overlapped metal strips.

Figure 3:
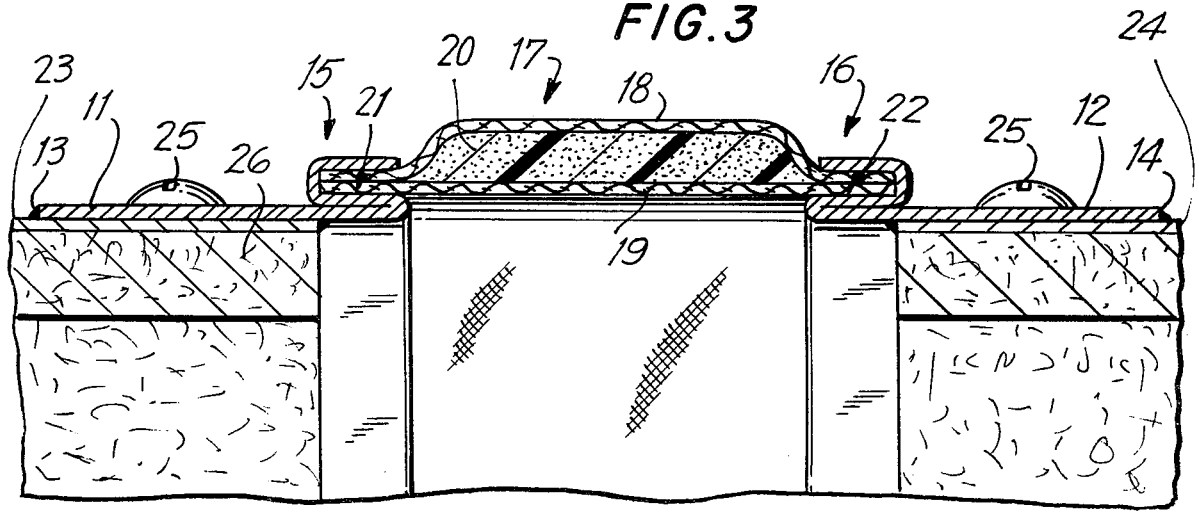
FIG. 3 is a section longitudinally of the ducts taken on the line 3—3 of FIG. 2.

The non-overlapped edges of the metal strips are bent by progressive sets of bending rolls to the configuration shown in FIG. 3, whereby the edge portions 21, 22 of the fabric strips are clampingly retained within the folded-over portions of the metal strips.

The formed material emerging from the rolling operation is coiled into a coil configuration, such as shown in FIG. 1, the coiling preferably being effected as the strips are fabricated, as suggested in U.S. Pat. No. 2,777,573. The connector material may then be boxed.

In use, a length of connector material is severed from the coil in accordance with the circumference of the duct. The material is thereafter opened out from the overlapping position of the coil to the open position shown in FIG. 3. The material is then bent transversely in a metal bending brake, in the manner illustrated in U.S. Pat. No. 3,214,807, so that the metal strips conform to the configuration of the adjacent duct sections, e.g. the sections 23, 24.

After bending to shape, the connector is secured to the duct sections, e.g. by a series of blind rivets or sheet metal screws 25 extending through the aligned openings in the metal strips and the underlying portions of the ducts 23, 24.

As will be appreciated from an inspection of FIG. 3, the attached flexible connector material will preclude air loss in the junction between the ducts 23, 24, while at the same time, by virtue of the dampening properties and non-rigidity of the central section comprised of fabric and insulation materials, preventing the transmission of vibrations through the duct system.

Figure 2:
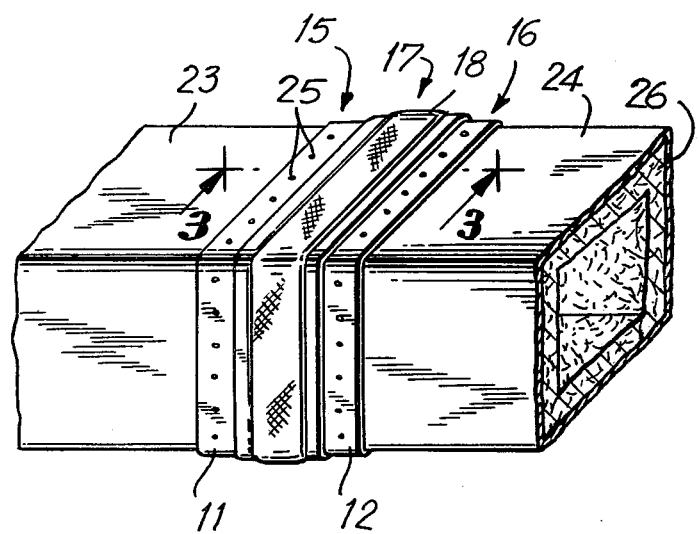
FIG. 2 is a fragmentary perspective view of a pair of duct sections spanned by a formed length of flexible connector material in accordance with the invention.

As best seen in FIGS. 2 and 3, the ducts 23, 24 may include an interior insulation layer 26. The insulating properties afforded by the insulating material 20 interposed between the fabric webs substantially augments the thermal integrity of the duct system by preventing heat loss at the point at which the greatest loss is experienced in systems heretofore known—the area covered by the flexible connector.

As noted, the insulating material 20 is preferably compressible so that the convolutions of the flexible stock material, when the same is formed into a roll, may lie tightly one against the other without having to allow for the additional bulk of the insulating material.

In the convoluted condition, the material 20 is compressed but returns to its expanded condition shown in FIG. 3 when the stock material is unrolled.

Optionally but preferably, the insulation 20 is floatingly disposed between the fabric layers and is unconnected thereto, being maintained in position by the fact that the edges of the fabric are connected to the metal. The non-attachment of the insulation enables the same to move, to a degree, relative to the fabric when the flexible connector material is secured to a duct.

As will be understood by those skilled in the art, the fabric strips, after attachment to the duct, may be somewhat kinked or wrinkled and the ability of the interior insulation to move permits a degree of flowing thereof to preclude the formation of voids.

Preferably, the insulating material is fed in the course of roll forming in a somewhat compressed condition, whereby the material tends to expand and puff out the fabric layers after attachment thereof to the duct, further reducing or minimizing the possibility of voids. Optionally, the inner fabric layer 19 may, as shown, be of somewhat lesser width than the outer layer whereby, after attachment, the outer layer is puffed outwardly, preventing intrusion of the inner layer into the air stream under the influence of the expanding insulation.

It will be appreciated that variations in the previously described material and method of making the same may occur to those skilled in the art who have been apprised of the instant disclosure. Accordingly, the invention is to be broadly construed within the scope of the appended claims.

Having thus described the invention and illustrated its use, what is claimed as new and is desired to be secured by Letters Patent is:

1. As a new article of manufacture, an elongate supply of improved flexible connector stock material from which lengths are adapted to be cut for formation by transverse bending to the configuration of an air duct, comprising two elongated metal strips, substantially flat in transverse section, and an elongate composite web of air impervious insulation and vibration damping material secured therebetween, each said metal strip having a free marginal edge and a clamping marginal edge comprised of a folded over longitudinal marginal portion of said strip, said flexible web comprising upper and lower layers of fabric defining a flattened tubular conformation, each of the side marginal edges of said upper and lower layers being clampingly crimped within said clamping marginal edge of one of said metal strips, thereby to maintain said layers in said tubular conformation, and a compressible, depthwisely resilient expansible strip of insulating material interposed between said layers and captured within said flattened tubular conformation by said clamping marginal edges, said strip of insulating material substantially filling the space within said tubular conformation.

2. A flexible connector material in accordance with claim 1 wherein the combined thickness of said layers and said insulating strip, in the uncompressed condition of said insulating strip, is greater than the thickness of said clamping marginal edges, said material being arranged in a coil, the material of said insulating strip in said coil configuration being compressed whereby the combined thickness of said web is substantially equal to the thickness of said clamping marginal edges as a result of compression of said web in said coiled configuration.

3. A flexible connector material in accordance with claim 1 wherein said insulating material is floatingly retained between said fabric layers of said web and is unconnected to said layers.

4. A flexible connector material in accordance with claim 3 wherein the transverse dimension of said insulating material is substantially equal to the spacing between said folded-over edge portions of said metal strips.

5. A flexible connector material in accordance with claim 1 wherein said insulating material is retained between said fabric layers in a compressed condition.

* * * * *